US007458211B2

(12) United States Patent
Koo

(10) Patent No.: US 7,458,211 B2
(45) Date of Patent: Dec. 2, 2008

(54) HYDRAULIC CONTROL SYSTEM FOR HEAVY CONSTRUCTION EQUIPMENT

(75) Inventor: Bon Seok Koo, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 293 days.

(21) Appl. No.: 11/510,775

(22) Filed: Aug. 25, 2006

(65) Prior Publication Data

US 2007/0057571 A1 Mar. 15, 2007

(30) Foreign Application Priority Data

Sep. 15, 2005 (KR) ...................... 10-2005-0085993

(51) Int. Cl.
*F16D 31/02* (2006.01)

(52) U.S. Cl. .............................. 60/452; 60/422; 60/447

(58) Field of Classification Search ................... 60/422, 60/443, 444, 447, 452
See application file for complete search history.

(56) References Cited

U.S. PATENT DOCUMENTS 4,426,194 A * 1/1984 Pollman ...................... 60/452
5,152,143 A * 10/1992 Kajita et al. .................. 60/452
5,447,027 A * 9/1995 Ishikawa et al. .............. 60/452
5,873,245 A * 2/1999 Kato et al. ..................... 60/452
6,105,367 A * 8/2000 Tsuruga et al. ................ 60/422

FOREIGN PATENT DOCUMENTS

JP 2003004001 A * 1/2003

* cited by examiner

*Primary Examiner*—Michael Leslie
(74) *Attorney, Agent, or Firm*—Ladas & Parry LLP

(57) ABSTRACT

A hydraulic control system is disclosed, which can minimize the flow rate of a hydraulic fluid being discharged from a variable displacement hydraulic pump by using pilot pressure constantly produced by a pilot pump when a switching valve is in a neutral position, and can adjust the flow rate of the hydraulic fluid being discharged from the variable displacement hydraulic pump by using pressure produced by a pressure generator positioned at the most downstream side of a bypass passage if a separate input signal is applied to the pressure generator when the switching valve is operated. The hydraulic control system includes a main variable displacement hydraulic pump, a pilot pump, a plurality of actuators, a switching valve interposed between the main pump and the actuators, a load pressure signal passage for guiding a part of the hydraulic fluid to a tank via the first flow control device, and a flow control device for the main pump installed on one side of the main pump to control the flow rate of the hydraulic fluid by adjusting the inclination angle of a swash plate in the main pump.

8 Claims, 7 Drawing Sheets

HYDRAULIC CONTROL SYSTEM FOR HEAVY CONSTRUCTION EQUIPMENT

CROSS-REFERENCE TO RELATED APPLICATION

This application is based on and claims priority from Korean Patent Application No. 10-2005-85993, filed on Sep. 15, 2005, the disclosure of which is incorporated herein in its entirety by reference.

BACKGROUND OF THE INVENTION

1. Field of the Invention

The present invention relates to a hydraulic control system for heavy construction equipment, and more particularly to a hydraulic control system that can minimize the flow rate of a hydraulic fluid being discharged from a variable displacement hydraulic pump by using pilot pressure constantly produced by a pilot pump when a switching valve is in a neutral position, and can adjust the flow rate of the hydraulic fluid being discharged from the variable displacement hydraulic pump by using pressure produced by a pressure generator positioned at the most downstream side of a bypass passage if a separate input signal is applied to the pressure generator when the switching valve is operated.

2. Description of the Prior Art

FIG. 1 shows a hydraulic circuit diagram illustrating the construction of a conventional hydraulic control system with negative control.

Referring to FIG. 1, the conventional hydraulic control system includes a main variable displacement hydraulic pump 2, a plurality of actuators (not shown), and a plurality of switching valves 10, 12, and 14 installed in series between the main variable displacement hydraulic pump 2 and a plurality of the actuators.

A pressure generator 30 is installed at the most downstream side of a bypass passage 20, and pressure produced by the pressure generator 30 is fed to a flow control valve for the hydraulic pump via a pressure signal line 32 to control the flow rate of the hydraulic fluid being discharged from the main variable displacement hydraulic pump 2 in response to the pressure.

With the construction of the conventional hydraulic system, when the switching valves 10, 12, and 14 are in a neutral mode, a hydraulic fluid flowing through the bypass passage 20 increases pressure by a specific level in the pressure signal line 32 through the pressure generator 30. The pressure is applied to the flow control device 40 for the main variable displacement hydraulic pump, so that the flow control device 40 decreases the flow rate of the hydraulic fluid being discharged from the main variable displacement hydraulic pump 2.

The hydraulic control system has been widely used for its convenient manipulation of a hydraulic excavator. This is because the pressure of the hydraulic fluid fed back to the main variable displacement hydraulic pump 2 from the switching valves 10, 12, and 14 is decreased, or the hydraulic fluid being discharged from the main variable displacement hydraulic pump 2 is supplied to the actuator, with a part of the hydraulic fluid draining away.

In this case, a part of the hydraulic fluid supplied from the main variable displacement hydraulic pump 2 to the switching valves 10, 12, and 14 drains away to a tank T via the bypass passage 20, when the switching valves 10, 12, and 14 are in a neutral mode or is in an operation mode. Consequently, since energy corresponding to the drained part is converted into heat, it creates a problem of energy loss.

More particularly, the pressure generated by the pressure generator 30 is fed to the flow control device 40 via the pressure signal line 32 according to the motion of the switching valves 10, 12, and 14. When the switching valves 10, 12, and 14 are in the neutral mode, the pressure in the pressure signal line 32 is raised, and thus the flow rate of the hydraulic fluid being discharged from the main variable displacement hydraulic pump 2 is decreased. If the switching valves 10, 12, and 14 move, the bypass passage 20 is closed. Thus, the pressure in the pressure signal line is lowered, and the flow rate of the hydraulic fluid being discharged from the main variable displacement hydraulic pump 2 is increased. Therefore, it will be understood from the pump pressure diagram shown in FIG. 2 that the pressure of the main variable displacement hydraulic pump 2 is increased by the load applied to the actuator connected to the switching valves 10, 12, and 14.

When the switching valves 10, 12, and 14 are in the neutral mode, the pressure (e.g., of about 30 to 40 bars) is generated corresponding to the pressure in the pressure signal line 32 by the pressure generator 30 in order to minimize the flow rate of the hydraulic fluid being discharged from the main variable displacement hydraulic pump 2. The pressure drains away to the tank T via the bypass passage 20, which is not effective in view of energy efficiency.

As shown in FIG. 3, another conventional hydraulic control system includes a main variable displacement hydraulic pump 52 connected to a hydraulic pressure supply passage 50, a plurality of actuators (not shown) driven by the hydraulic fluid discharged from the main variable displacement hydraulic pump 52, switching valves 60 and 62 interposed between the main variable displacement hydraulic pump 52 and the actuators, and connected in parallel with the hydraulic pressure supply passage 50, first flow control devices 64 and 66 interposed between the switching valves 60 and 62 and the actuators, a load pressure signal passage 70 for guiding a part of the hydraulic fluid, which is supplied by a switching motion of the switching valves 60 and 62, to a tank T via the first flow control devices 64 and 66, a second flow control device 82 installed on one side of the bypass passage 80 branched from the hydraulic pressure supply passage 50, and operated in an open direction or a closed direction according to the pressure difference between the pressure in the load pressure signal passage 70, pressure of a spring, and pressure in the bypass passage 80 to adjust the flow rate of the hydraulic fluid passing through the bypass passage 80, a pressure generator 90 installed at the most downstream side of the bypass passage 80 for generating pressure, a pressure signal line 92 pressurized by the pressure generator 90, and a flow control device 94 controlling the flow rate of the hydraulic fluid being discharged from the main variable displacement hydraulic pump by adjusting the inclination angle of a swash plate in the main variable displacement hydraulic pump 52.

With the construction shown in FIG. 3, when the switching valves 60 and 62 operate, the flow rate of the hydraulic fluid passing through the second flow control device 82 is varied depending upon the load pressure in the load pressure signal passage 70 and the pressure in the bypass passage 80. The flow rate of the hydraulic fluid being discharged from the main variable displacement hydraulic pump 52 is controlled by variation of the pressure in the pressure signal line 92. When the switching valves 60 and 62 are in the neutral mode, the pressure corresponding to the pressure applied in the pressure signal line 92 by the pressure generator 90 is generated in the main variable displacement hydraulic pump 52 so as to minimize the flow rate of the hydraulic fluid being discharged from the main variable displacement hydraulic pump 52. The pressure drains away to the tank T via the bypass passage 80, which is still not effective in view of energy efficiency.

SUMMARY OF THE INVENTION

Accordingly, the present invention has been made to solve the above-mentioned problems occurring in the prior art while advantages achieved by the prior art are maintained intact, and one object of the present invention is to provide a hydraulic control system capable of minimizing the flow rate of a hydraulic fluid being discharged from a main variable displacement hydraulic pump when a switching valve is in a neutral mode, and adjusting the flow rate of the hydraulic fluid being discharged from the main variable displacement hydraulic pump according to the pressure generated in a pressure signal line by a pressure generator when the switching valve is in an operation mode.

Another object of the present invention is to provide a hydraulic control system capable of minimizing the energy loss that results from drainage of the hydraulic fluid to a tank via a bypass passage when a switching valve is in a neutral mode.

In order to accomplish these objects, there is provided a hydraulic control system including a main variable displacement hydraulic pump with a hydraulic pressure supply passage extended from one side thereof; a pilot pump for generating a pilot pressure signal; a plurality of actuators driven by a hydraulic fluid discharged from the main variable displacement hydraulic pump; a switching valve interposed between the main variable displacement hydraulic pump and the actuators and connected to the hydraulic pressure supply passage; a first flow control device interposed between the main variable displacement hydraulic pump and the actuators; a load pressure signal passage for guiding a part of the hydraulic fluid, which is supplied by a switching motion of the switching valve, to a tank via the first flow control device; a bypass passage branched from the hydraulic pressure supply passage; a second flow control device installed on one side of the bypass passage and operated in an open direction or a closed direction according to the pressure difference between the pressure in the load pressure signal passage, pressure of a spring, and pressure in the bypass passage to adjust the flow rate of the hydraulic fluid passing through the bypass passage; a pressure generator installed at the most downstream side of the bypass passage; and a flow control device for the main variable displacement hydraulic pump installed on one side of the main variable displacement hydraulic pump to control the flow rate of the hydraulic fluid being discharged from the main variable displacement hydraulic pump by adjusting the inclination angle of a swash plate in the main variable displacement hydraulic pump, wherein when the switching valve is in a neutral mode, the flow rate of the hydraulic fluid being discharged from the main variable displacement hydraulic pump is minimized by using the pilot pressure signal constantly produced by the pilot pump, and, when the switching valve is operated, an additional input signal is applied to the pressure generator, so that the flow rate of the hydraulic fluid being discharged from the variable displacement hydraulic pump is controlled by the pressure produced from the pressure generator.

According to another aspect of the present invention, there is provided a hydraulic control system including a main variable displacement hydraulic pump with a bypass passage extended from one side thereof; a pilot pump for generating a pilot pressure signal; a plurality of actuators driven by a hydraulic fluid discharged from the main variable displacement hydraulic pump; a switching valve interposed between the main variable displacement hydraulic pump and the actuators and connected to the bypass passage; a flow control device for the main variable displacement hydraulic pump installed on one side of the main variable displacement hydraulic pump to control the flow rate of the hydraulic fluid being discharged from the main variable displacement hydraulic pump by adjusting the inclination angle of a swash plate in the main variable displacement hydraulic pump; a first signal line with an inlet side connected to the pilot pump; a second signal line with an outlet side connected to the flow control device; a third signal line branched from the bypass passage; a pressure generator installed on an outlet side of the bypass passage, and bypassing the hydraulic fluid discharged from the main variable displacement hydraulic pump to the tank intact at an initial state and passing the hydraulic fluid through an orifice to generate a given level of pressure in the bypass passage when the switching valve is switched by an input signal; and an auxiliary switching valve interposed between the second signal line and the third signal line, and communicating the first signal line with the second signal line at the initial state and communicating the second signal line with the third signal line when the switching valve is switched by the input signal.

According to still another aspect of the present invention, there is provided a hydraulic control system including a main variable displacement hydraulic pump with a hydraulic fluid supply passage extended from one side thereof; a pilot pump for generating a pilot pressure signal; a plurality of actuators driven by a hydraulic fluid discharged from the main variable displacement hydraulic pump; a switching valve interposed between the main variable displacement hydraulic pump and the actuators and connected in parallel to the bypass passage; a first flow control device interposed between the switching valve and the actuators; a load pressure signal passage for guiding a part of the hydraulic fluid, which is supplied by a switching motion of the switching valve, to a tank via the first flow control device or a check valve; a bypass passage branched from the hydraulic pressure supply passage; a second flow control device installed on one side of the bypass passage and operated in an open direction or a closed direction according to the pressure difference between the pressure in the load pressure signal passage, pressure of a spring, and pressure in the bypass passage to adjust the flow rate of the hydraulic fluid passing through the bypass passage; a flow control device for the main variable displacement hydraulic pump installed on one side of the main variable displacement hydraulic pump to control the flow rate of the hydraulic fluid being discharged from the main variable displacement hydraulic pump by adjusting the inclination angle of a swash plate in the main variable displacement hydraulic pump; a fourth signal line having an inlet side connected to the pilot pump and an outlet side connected to the pressure generator; a fifth signal line having an inlet side connected to the pressure generator and an outlet side connected to the flow control device; and a pressure generator installed at the most downstream side of the bypass passage, and, at the initial state, communicating the load pressure signal passage with the tank at one side thereof and communicating the fourth signal line with the fifth signal line at other side thereof, while when the pressure generator is switched by an input signal, disconnecting the fourth signal line from the fifth signal line at the one side and communicating the bypass passage with the fifth signal line at the other side.

According to still another aspect of the present invention, there is provided a hydraulic control system including a main variable displacement hydraulic pump with a hydraulic fluid supply passage extended from one side thereof; a pilot pump for generating a pilot pressure signal; a plurality of actuators driven by a hydraulic fluid discharged from the main variable displacement hydraulic pump; a switching valve interposed between the main variable displacement hydraulic pump and the actuators and connected in parallel to the bypass passage; a first flow control device interposed between the switching valve and the actuators; a load pressure signal passage for guiding a part of the hydraulic fluid, which is supplied by a switching motion of the switching valve, to a tank via the first flow control device or a check valve; a bypass passage branched from the hydraulic pressure supply passage; a second flow control device installed on one side of the bypass passage and operated in an open direction or a closed direction according to the pressure difference between the pressure in the load pressure signal passage, pressure of a spring, and pressure in the bypass passage to adjust the flow rate of the hydraulic fluid passing through the bypass passage; a flow control device for the main variable displacement hydraulic pump installed on one side of the main variable displacement hydraulic pump to control the flow rate of the hydraulic fluid being discharged from the main variable displacement hydraulic pump by adjusting the inclination angle of a swash plate in the main variable displacement hydraulic pump; a sixth signal line having an inlet side connected to the pilot pump; a seventh signal line having an outlet side connected to the flow control device; a branch line branched from the bypass passage; a shuttle valve mixing the hydraulic fluid of the branch line and the hydraulic fluid of the seventh signal line; and a pressure generator installed at the most downstream side of the bypass passage, and, at the initial state, communicating the load pressure signal passage with the tank at one side thereof and communicating the sixth signal line with the seventh signal line at other side thereof, while when the pressure generator is switched by an input signal, disconnecting the sixth signal line from the seventh signal line at the one side and communicating the bypass passage with the seventh signal line at the other side.

Preferably, the input signal is an auto deceleration signal to detect motion of the switching valve.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

The construction of a hydraulic control system according to the present invention will now be described in detail with reference to preferred embodiments.

Figure 1:
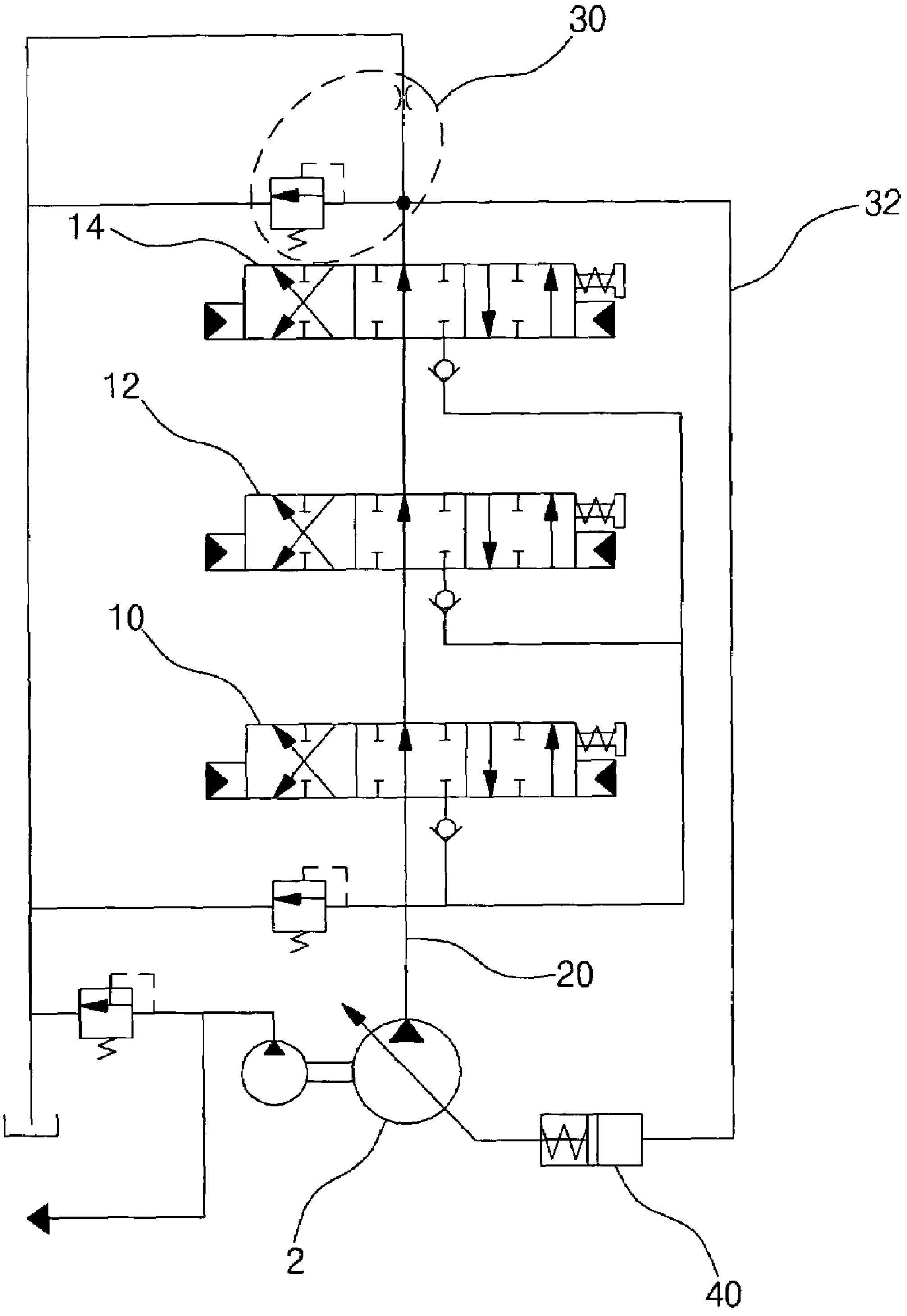
Fig. 1 Prior Art
FIG. 1 is a hydraulic circuit diagram illustrating the construction of a conventional hydraulic control system.
Figure 2:
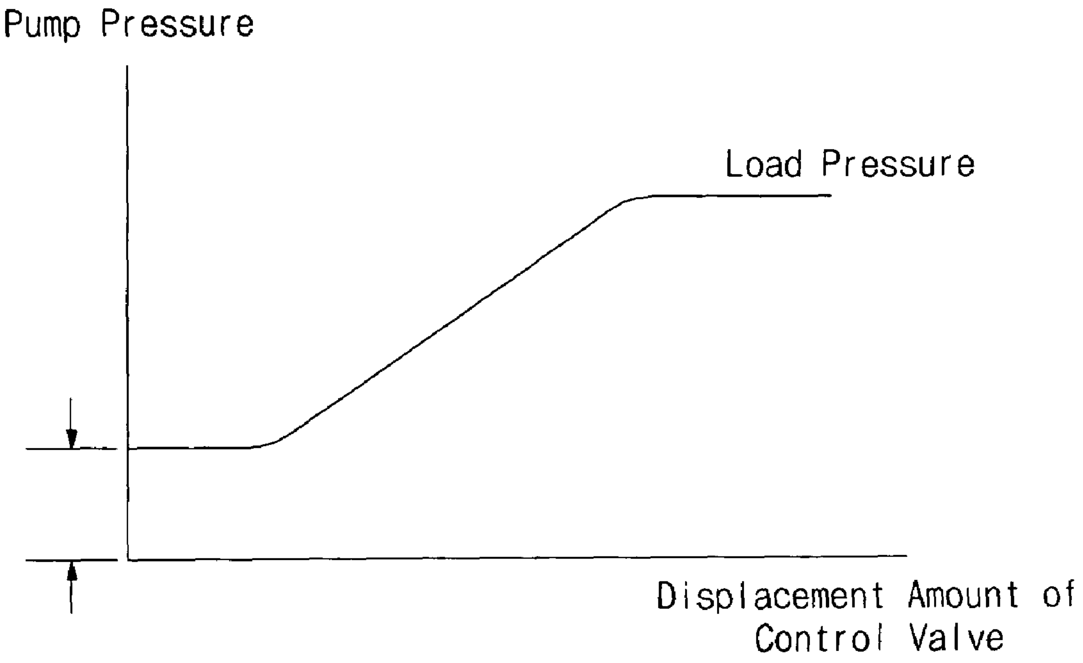
Fig. 2 Prior Art
FIG. 2 is a pump pressure diagram of a conventional hydraulic control system.
Figure 3:
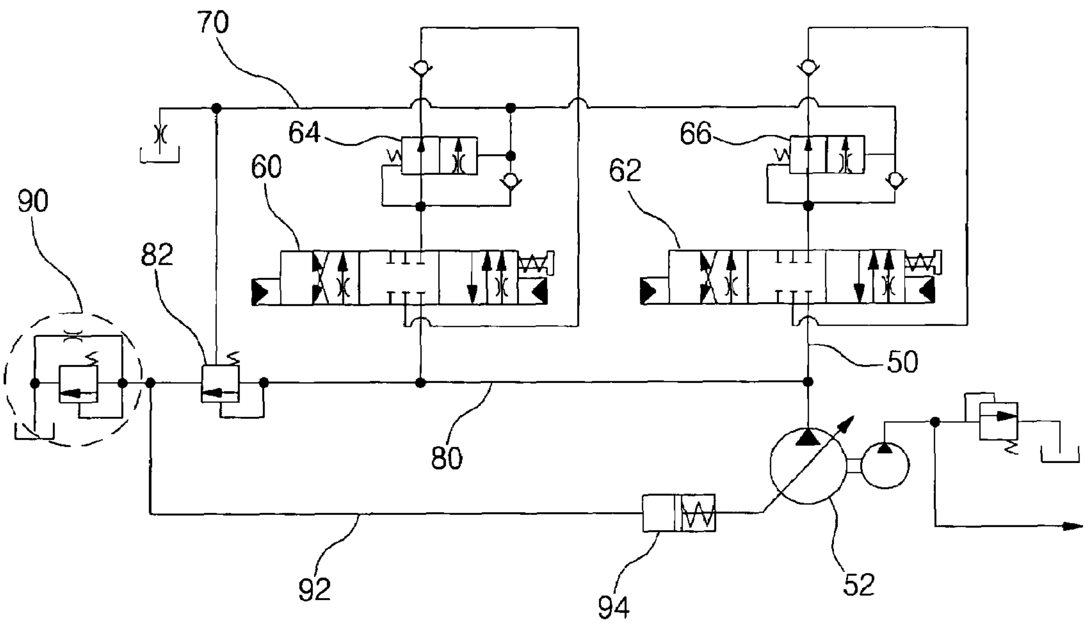
Fig. 3 Prior Art
FIG. 3 is a hydraulic circuit diagram illustrating the construction of a conventional hydraulic control system.
Figure 4:
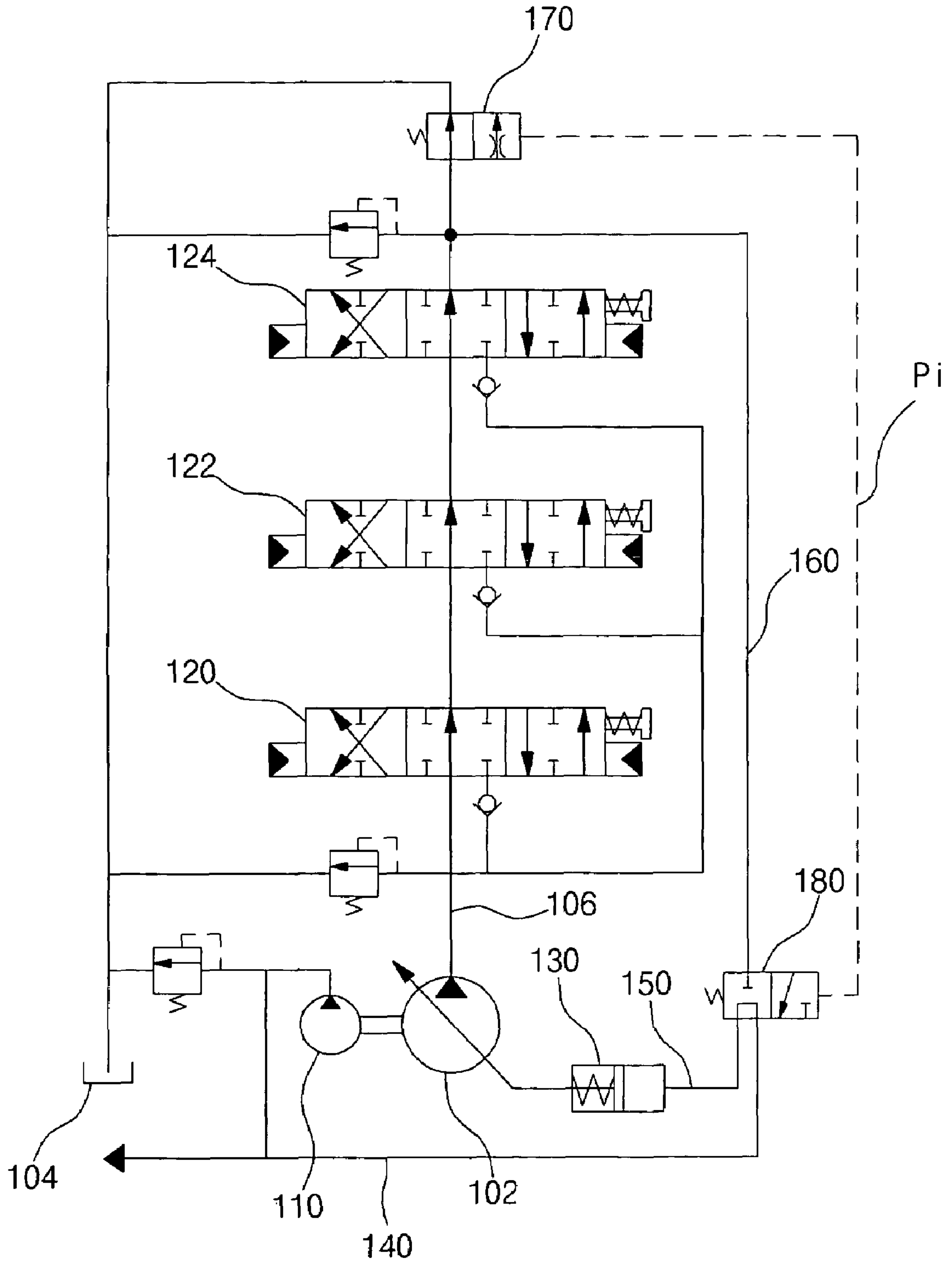
FIG. 4 is a hydraulic circuit diagram illustrating the construction of a hydraulic control system according to an embodiment of the present invention.
Figure 5:
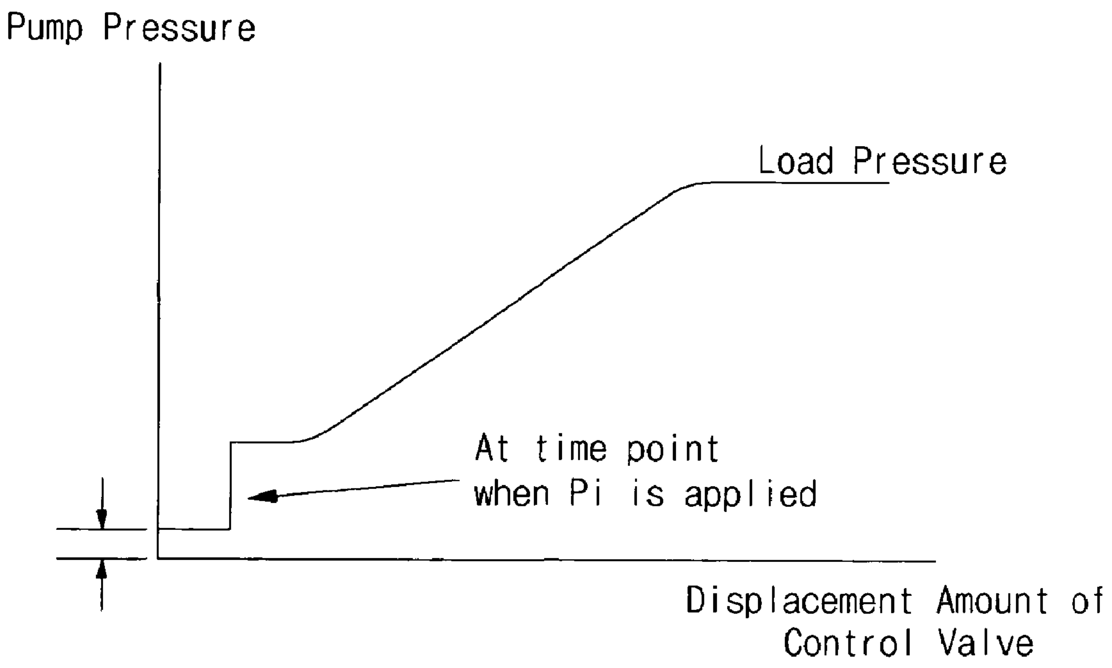
FIG. 5 is a pump pressure diagram of a hydraulic control system according to the present invention.
Figure 6:
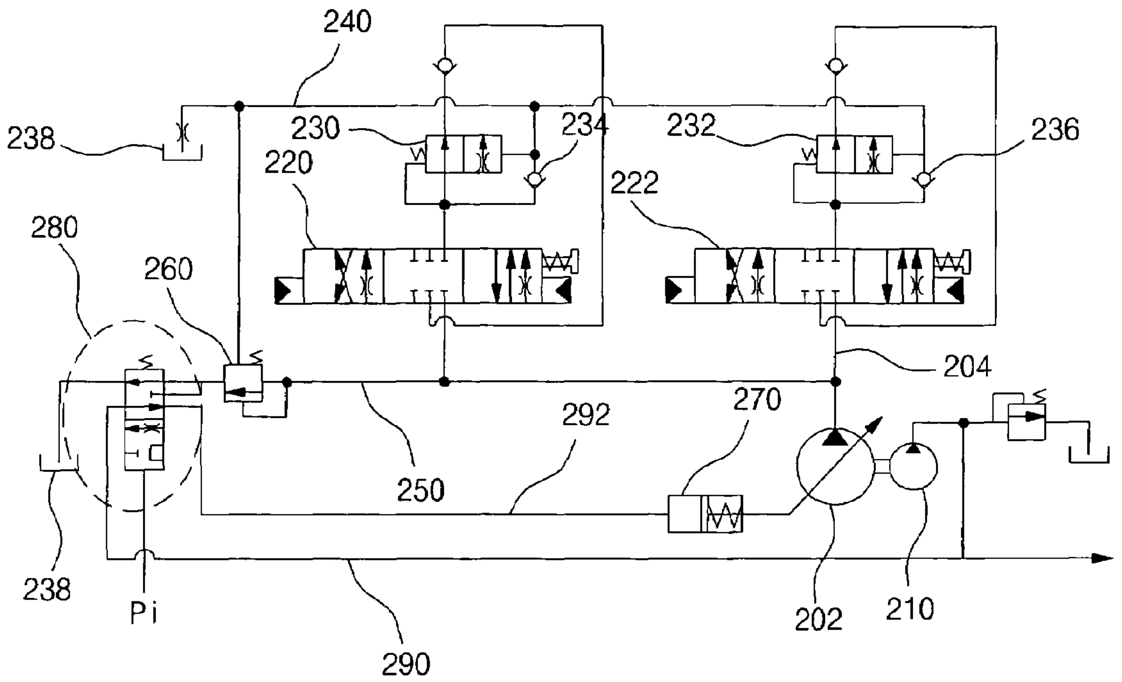
FIG. 6 is a hydraulic circuit diagram illustrating the construction of a hydraulic control system according to another embodiment of the present invention.
Figure 7:
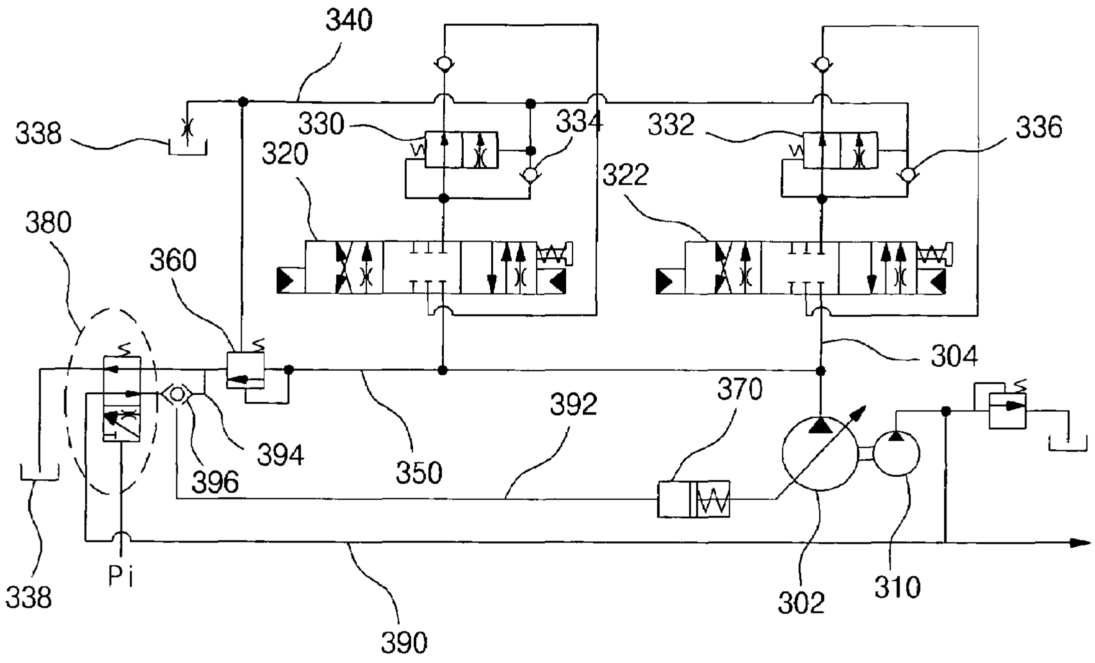
FIG. 7 is a hydraulic circuit diagram illustrating the construction of a hydraulic control system according to another embodiment of the present invention.

FIG. 4 is a hydraulic circuit diagram illustrating the construction of a hydraulic control system according to an embodiment of the present invention. FIG. 5 is a pump pressure diagram of FIG. 4. FIGS. 6 and 7 are hydraulic circuit diagrams illustrating the construction of a hydraulic control system according to alternative embodiments of the present invention.

As shown in FIG. 4, the hydraulic control system according to an embodiment of the present invention includes a main variable displacement hydraulic pump 102, a bypass passage 106 extended from the main variable displacement hydraulic pump 102 for draining a hydraulic fluid to a tank 104, a pilot pump 110 for generating a pilot pressure signal, a plurality of actuators (not shown) driven by the hydraulic fluid discharged from the main variable displacement hydraulic pump 102, switching valves 120, 122, and 124 interposed between the main variable displacement hydraulic pump 102 and the actuators, and a flow control device 130 for the main variable displacement hydraulic pump installed on one side of the main variable displacement hydraulic pump 102 to control the flow rate of the hydraulic fluid being discharged from the main variable displacement hydraulic pump 102 by adjusting the inclination angle of a swash plate in the main variable displacement hydraulic pump 102.

Also, the hydraulic control system according to the embodiment of the present invention includes a first signal line 140 with an inlet side connected to the pilot pump 110, a second signal line 150 with an outlet side connected to the flow control device 130, a third signal line 160 branched from the bypass passage 106, a pressure generator 170 installed on the outlet side of the bypass passage 106, and bypassing the hydraulic fluid discharged from the main variable displacement hydraulic pump 102 to the tank 104 intact at an initial state and passing the hydraulic fluid through an orifice to generate a given level of pressure in the bypass passage 106 when the switching valves are switched by an input signal Pi, and an auxiliary switching valve 180 interposed between the second signal line 150 and the third signal line 160, and communicating the first signal line 140 with the second signal line 150 at an initial state and communicating the second signal line 150 with the third signal line 160 when the switching valves are switched by the input signal Pi.

The operation of the hydraulic control system according to the embodiment of the present invention will now be described in brief detail with reference to FIG. 4.

When the switching valves 120, 122, and 124 are in the neutral mode and the input signal Pi is not applied, the pressure constantly maintained in the pilot pump 110 is applied to the flow control device 130 via the first signal line 140, the auxiliary switching valve 180, and the second signal line 150, as shown in FIG. 4. The main variable displacement hydraulic pump 102 is controlled so that the flow rate of the hydraulic fluid being discharged from the main variable displacement hydraulic pump 102 is minimized. Thus, since the pressure generator 170 is in an initial state, the flow rate, which is controlled to be minimized, of the hydraulic fluid being discharged from the main variable displacement hydraulic pump 102 is returned to the tank 104 via the bypass passage 106. At that time, because the pressure is maintained at a very low level, the energy to be consumed by the main variable displacement hydraulic pump 102 is minimized.

If the switching valves 120, 122, and 124 are switched, and an auto deceleration signal pressure Pi is respectively applied to the auxiliary switching valve 180 and the pressure generator 170 as an input signal to detect the motion of the switching valves 120, 122, and 124, the auxiliary switching valve 180 is switched so that the first signal line 140 and the second signal line 150 are shut and the second signal line 150 is connected to the third signal line 160. Thus, the hydraulic fluid is returned to the tank 104 via the bypass passage 106. However, since the pressure generator 170 is switched and thus the pressure in the bypass passage 106 is increased, the main variable displacement hydraulic pump 102 is controlled by the pressure applied from the third signal line 160. The flow control device 130 increases or decreases the flow rate of the hydraulic fluid being discharged from the main variable displacement hydraulic pump 102 according to the pressure of the third signal line. 160.

With the construction, the initial pressure generated by the pressure generator 170 installed on the outlet side of the bypass passage 106 to control the flow rate of the hydraulic fluid being discharged from the main variable displacement hydraulic pump 102 can be maintained at a low level, as shown in FIG. 5, so as to improve the loss of the hydraulic fluid returned to the tank 104 via the bypass passage 106. Consequently, there is an advantage of minimizing the energy to be consumed by the main variable displacement hydraulic pump 102 when the switching valves 120, 122, and 124 are in the neutral mode.

Referring to FIG. 6, a hydraulic control system according to an alternative embodiment of the present invention includes a main variable displacement hydraulic pump 202, a hydraulic pressure supply passage 204 extended from the main variable displacement hydraulic pump 202, a pilot pump 210 for generating a pilot pressure signal, a plurality of actuators (not shown) driven by the hydraulic fluid discharged from the main variable displacement hydraulic pump 202, switching valves 220 and 222 interposed between the main variable displacement hydraulic pump 202 and the actuators and connected in parallel with the hydraulic pressure supply passage 204, first flow control devices 230 and 232 interposed between the main variable displacement hydraulic pump 202 and the actuators, a load pressure signal passage 240 for guiding a part of the hydraulic fluid, which is supplied by a switching motion of the switching valves 220 and 222, to a tank 238 via the first flow control devices 230 and 232 or check valves 234 and 236, a bypass passage 250 branched from the hydraulic pressure supply passage 204, a second flow control device 260 installed on one side of the bypass passage 250 and operated in an open direction or a closed direction according to the pressure difference between the pressure in the load pressure signal passage 240, pressure of a spring, and pressure in the bypass passage 250 to adjust the flow rate of the hydraulic fluid passing through the bypass passage 250, a flow control device 270 for the main variable displacement hydraulic pump installed on one side of the main variable displacement hydraulic pump 202 to control the flow rate of the hydraulic fluid being discharged from the main variable displacement hydraulic pump 202 by adjusting the inclination angle of a swash plate in the main variable displacement hydraulic pump 202, and a pressure generator 280 installed at the most downstream side of the bypass passage 250.

The hydraulic control system according to the alternative embodiment of the present invention also includes a fourth signal line 290 having an inlet side connected to the pilot pump 210 and an outlet side connected to the pressure generator 280, and a fifth signal line 292 having an inlet side connected to the pressure generator 280 and an outlet side connected to the flow control device 270.

The bypass passage 250 is connected to one inlet port of the pressure generator 280, and the tank 238 is connected to one outlet port. The fourth signal line 290 is connected to the other inlet port, and the fifth signal line 292 is connected to the other outlet port. In the initial state of the pressure generator 280, the tank 238 is communicated with the bypass passage 250, and the fourth signal line 290 is communicated with the fifth signal line 292. When the input signal Pi is applied to the pressure generator 280 to switch the pressure generator 280, the fourth signal line 290 is disconnected from the fifth signal line 292, and the bypass passage 250 is communicated with the fifth signal line 292.

The operation of the hydraulic control system according to the alternative embodiment of the present invention will now be described in brief with reference to FIG. 6.

When the switching valves 220 and 222 are in the neutral mode and the input signal Pi is not applied, the pressure constantly maintained in the pilot pump 210 is applied to the flow control device 270 via the fourth signal line 290, the pressure generator 280, and the fifth signal line 292, as shown in FIG. 6. The main variable displacement hydraulic pump 202 is controlled so that the flow rate of the hydraulic fluid being discharged from the main variable displacement hydraulic pump 202 is minimized.

If the switching valves 220 and 222 are switched, and an auto deceleration signal pressure Pi is applied to the pressure generator 280 as an input signal to detect the motion of the switching valves 220 and 222, the hydraulic fluid is returned to the tank 238 via the bypass passage 250 and the pressure generator 280. However, since the pressure in the bypass passage 250 is increased, the main variable displacement hydraulic pump 202 is controlled by the pressure applied from the fifth signal line 292. The flow control device 270 increases or decreases the flow rate of the hydraulic fluid being discharged from the main variable displacement hydraulic pump 202 according to the pressure of the fifth signal line 292.

Referring to FIG. 7, a hydraulic control system according to an alternative embodiment of the present invention includes a main variable displacement hydraulic pump 302, a hydraulic pressure supply passage 304 extended from the main variable displacement hydraulic pump 302, a pilot pump 310 for generating a pilot pressure signal, a plurality of actuators (not shown) driven by the hydraulic fluid discharged from the main variable displacement hydraulic pump 302, switching valves 320 and 322 interposed between the main variable displacement hydraulic pump 302 and the actuators and connected in parallel with the hydraulic pressure supply passage 304, first flow control devices 330 and 332 interposed between the main variable displacement hydraulic pump 302 and the actuators, a load pressure signal passage 340 for guiding a part of the hydraulic fluid, which is supplied by a switching motion of the switching valves 320 and 322, to a tank 338 via the first flow control devices 330 and 332 or check valves 334 and 336, a bypass passage 350 branched from the hydraulic pressure supply passage 304, a second flow control device 360 installed on one side of the bypass passage 350 and operated in an open direction or a closed direction according to the difference among the pressure in the load pressure signal passage 340, pressure of a spring, and pressure in the bypass passage 350, to adjust the flow rate of the hydraulic fluid passing through the bypass passage 350, a flow control device 370 for the main variable displacement hydraulic pump installed on one side of the main variable displacement hydraulic pump 302 to control the flow rate of the hydraulic fluid being discharged from the main variable displacement hydraulic pump 302 by adjusting the inclination angle of a swash plate in the main variable displacement hydraulic pump 302, a pressure generator 380 installed at the most downstream side of the bypass passage 250, a sixth signal line 390 having an inlet side connected to the pilot pump 310 and an outlet side connected to the pressure generator 380, a seventh signal line 392 having an inlet side connected to the pressure generator 380 and an outlet side connected to the flow control device 370, a branch line 394 branched from the bypass passage 350, and a shuttle valve 396 taking the branch line 394 and the sixth signal line 390 as an inlet side and the seventh signal line 392 as an outlet side.

The bypass passage 350 is connected to one inlet port of the pressure generator 380, and the tank 338 is connected to one outlet port. The sixth signal line 390 is connected to the other inlet port, and the seventh signal line 392 is connected to the other outlet port. In the initial state of the pressure generator 380, the tank 338 is communicated with the bypass passage 350, and the sixth signal line 390 is communicated with the seventh signal line 392. When the input signal Pi is applied to the pressure generator 380 to switch the pressure generator 380, the sixth signal line 390 is disconnected from the seventh signal line 392, and the bypass passage 350 is communicated with the seventh signal line 392.

The operation of the hydraulic control system according to the alternative embodiment of the present invention will now be described in brief detail with reference to FIG. 7.

When the switching valves 320 and 322 are in the neutral mode and the input signal Pi is not applied, the pressure constantly maintained in the pilot pump 110 is applied to the flow control device 370 via the sixth signal line 390, the pressure generator 380, the shuttle valve 396, and the seventh signal line 392, as shown in FIG. 6. The main variable displacement hydraulic pump 302 is controlled so that the flow rate of the hydraulic fluid being discharged from the main variable displacement hydraulic pump 302 is minimized. Thus, since the flow rate, which is controlled to be minimized, of the hydraulic fluid being discharged from the main variable displacement hydraulic pump 302 is returned to the tank 338 via the bypass passage 350 and the pressure generator 380, the pressure in the bypass passage 350 is decreased to a very low level, and the energy to be consumed by the main variable displacement hydraulic pump 302 is minimized.

If the switching valves 320 and 322 are switched, and an auto deceleration signal pressure Pi is applied to the pressure generator 380 as an input signal to detect the motion of the switching valves 320 and 322, the hydraulic fluid is returned to the tank 338 via the bypass passage 350 and the pressure generator 380. However, since the pressure in the bypass passage 350 is increased, the main variable displacement hydraulic pump 302 is controlled by the pressure applied from the seventh signal line 392. The flow control device 370 increases or decreases the flow rate of the hydraulic fluid being discharged from the main variable displacement hydraulic pump 302 according to the pressure of the seventh signal line 392.

As the above description, when the switching valves are in the initial state, the flow rate of the hydraulic fluid discharged from the main variable displacement hydraulic pump is minimized by the pilot pressure constantly generated from the pilot pump. If the motion of the switching valves is detected by the auto deceleration signal in the switched state and additional input signal is applied to the pressure generator, the flow rate of the hydraulic fluid discharged from the main variable displacement hydraulic pump is controlled depending upon the pressure in the downstream side of the bypass passage.

Therefore, the present invention has the following effects.

When the switching valves are in the neutral mode, the flow rate of the hydraulic fluid initially discharged from the main variable displacement hydraulic pump can be minimized by applying the signal pressure, which is generated by the pressure of the pilot pump, to the pressure generator.

Also, since hydraulic fluid freely drains away to the tank via a center bypass passage, the initial load of the main variable displacement hydraulic pump can be minimized. Consequently, the energy to be consumed by the main variable displacement hydraulic pump can be minimized in the neutral state of the switching valve.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A hydraulic control system for heavy construction equipment comprising:

- a main variable displacement hydraulic pump with a hydraulic pressure supply passage extended from one side thereof;
- a pilot pump for generating a pilot pressure signal;
- a plurality of actuators driven by a hydraulic fluid discharged from the main variable displacement hydraulic pump;
- a switching valve interposed between the main variable displacement hydraulic pump and the actuators and connected to the hydraulic pressure supply passage;
- a first flow control device interposed between the main variable displacement hydraulic pump and the actuators;
- a load pressure signal passage for guiding a part of the hydraulic fluid, which is supplied by a switching motion of the switching valve, to a tank via the first flow control device;
- a bypass passage branched from the hydraulic pressure supply passage; a second flow control device installed on one side of the bypass passage and operated in an open direction or a closed direction according to the pressure difference between the pressure in the load pressure signal passage, pressure of a spring, and pressure in the bypass passage to adjust the flow rate of the hydraulic fluid passing through the bypass passage;
- a pressure generator installed at the most downstream side of the bypass passage; and
- a flow control device for the main variable displacement hydraulic pump installed on one side of the main variable displacement hydraulic pump to control the flow rate of the hydraulic fluid being discharged from the main variable displacement hydraulic pump by adjusting the inclination angle of a swash plate in the main variable displacement hydraulic pump;
- wherein when the switching valve is in a neutral mode, the flow rate of the hydraulic fluid being discharged from the main variable displacement hydraulic pump is minimized by using the pilot pressure signal constantly produced by the pilot pump, and, when the switching valve is operated, an additional input signal is applied to the pressure generator, so that the flow rate of the hydraulic fluid being discharged from the variable displacement hydraulic pump is controlled by the pressure produced from the pressure generator.

2. The hydraulic control system as claimed in claim 1, wherein the input signal is an auto deceleration signal to detect motion of the switching valve.

3. A hydraulic control system for heavy construction equipment comprising:

a main variable displacement hydraulic pump with a bypass passage extended from one side thereof;

a pilot pump for generating a pilot pressure signal;

a plurality of actuators driven by a hydraulic fluid discharged from the main variable displacement hydraulic pump;

a switching valve interposed between the main variable displacement hydraulic pump and the actuators and connected to the bypass passage;

a flow control device for the main variable displacement hydraulic pump installed on one side of the main variable displacement hydraulic pump to control the flow rate of the hydraulic fluid being discharged from the main variable displacement hydraulic pump by adjusting the inclination angle of a swash plate in the main variable displacement hydraulic pump;

a first signal line with an inlet side connected to the pilot pump;

a second signal line with an outlet side connected to the flow control device;

a third signal line branched from the bypass passage;

a pressure generator installed on an outlet side of the bypass passage, and bypassing the hydraulic fluid discharged from the main variable displacement hydraulic pump to the tank intact at an initial state and passing the hydraulic fluid through an orifice to generate a given level of pressure in the bypass passage when the switching valve is switched by an input signal; and an auxiliary switching valve interposed between the second signal line and the third signal line, and communicating the first signal line with the second signal line at the initial state and communicating the second signal line with the third signal line when the switching valve is switched by the input signal.

4. The hydraulic control system as claimed in claim 3, wherein the input signal is an auto deceleration signal to detect motion of the switching valve.

5. A hydraulic control system for heavy construction equipment comprising:

a main variable displacement hydraulic pump with a hydraulic fluid supply passage extended from one side thereof;

a pilot pump for generating a pilot pressure signal;

a plurality of actuators driven by a hydraulic fluid discharged from the main variable displacement hydraulic pump;

a switching valve interposed between the main variable displacement hydraulic pump and the actuators and connected in parallel to the bypass passage;

a first flow control device interposed between the switching valve and the actuators;

a load pressure signal passage for guiding a part of the hydraulic fluid, which is supplied by a switching motion of the switching valve, to a tank via the first flow control device or a check valve;

a bypass passage branched from the hydraulic pressure supply passage;

a second flow control device installed on one side of the bypass passage and operated in an open direction or a closed direction according to the pressure difference between the pressure in the load pressure signal passage, pressure of a spring, and pressure in the bypass passage to adjust the flow rate of the hydraulic fluid passing through the bypass passage;

a flow control device for the main variable displacement hydraulic pump installed on one side of the main variable displacement hydraulic pump to control the flow rate of the hydraulic fluid being discharged from the main variable displacement hydraulic pump by adjusting the inclination angle of a swash plate in the main variable displacement hydraulic pump;

a fourth signal line having an inlet side connected to the pilot pump and an outlet side connected to the pressure generator;

a fifth signal line having an inlet side connected to the pressure generator and an outlet side connected to the flow control device; and a pressure generator installed at the most downstream side of the bypass passage, and, at the initial state, communicating the load pressure signal passage with the tank at one side thereof and communicating the fourth signal line with the fifth signal line at the other side thereof, while when the pressure generator is switched by an input signal, disconnecting the fourth signal line from the fifth signal line at the one side and communicating the bypass passage with the fifth signal line at the other side.

6. The hydraulic control system as claimed in claim 5, wherein the input signal is an auto deceleration signal to detect motion of the switching valve.

7. A hydraulic control system for heavy construction equipment comprising:

a main variable displacement hydraulic pump with a hydraulic fluid supply passage extended from one side thereof;

a pilot pump for generating a pilot pressure signal;

a plurality of actuators driven by a hydraulic fluid discharged from the main variable displacement hydraulic pump;

a switching valve interposed between the main variable displacement hydraulic pump and the actuators and connected in parallel to the bypass passage;

a first flow control device interposed between the switching valve and the actuators;

a load pressure signal passage for guiding a part of the hydraulic fluid, which is supplied by a switching motion of the switching valve, to a tank via the first flow control device or a check valve;

a bypass passage branched from the hydraulic pressure supply passage;

a second flow control device installed on one side of the bypass passage and operated in an open direction or a closed direction according to the pressure difference between the pressure in the load pressure signal passage, pressure of a spring, and pressure in the bypass passage to adjust the flow rate of the hydraulic fluid passing through the bypass passage;

a flow control device for the main variable displacement hydraulic pump installed on one side of the main variable displacement hydraulic pump to control the flow rate of the hydraulic fluid being discharged from the main variable displacement hydraulic pump by adjusting the inclination angle of a swash plate in the main variable displacement hydraulic pump;

a sixth signal line having an inlet side connected to the pilot pump;

a seventh signal line having an outlet side connected to the flow control device;

a branch line branched from the bypass passage;

a shuttle valve mixing the hydraulic fluid of the branch line and the hydraulic fluid of the seventh signal line; and a pressure generator installed at the most downstream side of the bypass passage, and, at the initial state, communicating the load pressure signal passage with the tank at one side thereof and communicating the sixth signal line with the seventh signal line at the other side thereof, while when the pressure generator is switched by an input signal, disconnecting the sixth signal line from the seventh signal line at the one side and communicating the bypass passage with the seventh signal line at the other side.

8. The hydraulic control system as claimed in claim 7, wherein the input signal is an auto deceleration signal to detect motion of the switching valve.

* * * * *